United States Patent [19]

Matsumura et al.

[11] Patent Number: 4,901,220
[45] Date of Patent: Feb. 13, 1990

[54] PART PROFILE INPUT METHOD

[75] Inventors: Teruyuki Matsumura; Noritake Nagashima, both of Tokyo, Japan

[73] Assignee: Fanuc Ltd, Minamitsuru, Japan

[21] Appl. No.: 283,476

[22] PCT Filed: Apr. 7, 1988

[86] PCT No.: PCT/JP88/00349
§ 371 Date: Dec. 2, 1988
§ 102(e) Date: Dec. 2, 1988

[87] PCT Pub. No.: WO88/08157
PCT Pub. Date: Oct. 20, 1988

[30] Foreign Application Priority Data

Apr. 7, 1987 [JP] Japan .................................. 62-85412

[51] Int. Cl.$^4$ ............................................ G05B 19/403
[52] U.S. Cl. ............................... 364/191; 364/474.26; 364/474.27
[58] Field of Search ................. 364/188–193, 364/474.22, 474.27

[56] References Cited

U.S. PATENT DOCUMENTS

| | | | |
|---|---|---|---|
| 4,521,860 | 6/1985 | Kanematsu et al. | 364/191 |
| 4,524,414 | 6/1985 | Kiyokawa | 364/189 |
| 4,528,633 | 7/1985 | Sakai et al. | 364/474 |
| 4,530,046 | 7/1985 | Munekata et al. | 364/191 |
| 4,547,854 | 10/1985 | Hashimoto et al. | 364/474 |
| 4,556,833 | 12/1985 | Kishi et al. | 364/474 |
| 4,722,045 | 1/1988 | Kishi et al. | 364/191 |
| 4,723,203 | 2/1988 | Kishi et al. | 364/191 |
| 4,750,105 | 6/1988 | Ohkawa et al. | 364/191 |
| 4,788,636 | 11/1988 | Shiratori et al. | 364/191 |
| 4,823,253 | 4/1989 | Shima et al. | 364/188 |

Primary Examiner—Allen MacDonald
Attorney, Agent, or Firm—Staas & Halsey

[57] ABSTRACT

The invention relates to a part profile input method for inputting the profile elements of a part using arrow keys. When inputting a part profile, an angle ($A_i$) defined by two mutually adjacent profile elements ($EL_i$, $EL_{i+1}$) is computed, and whether the corner is in outside corner or an inside corner is determined by comparing the angle of intersection and a set angle. In case of an outside corner, a preset chamfer dimension (DIM) is displayed. If the dimension is acceptable, an input key is pressed to input the chamfer profile (CF) at the corner portion. In case of an inner corner, a prompt display is presented inquiring whether a rounded profile is to be inserted. If insertion is required, a dimension is inputted and the input key is pressed to input the rounded profile.

4 Claims, 11 Drawing Sheets

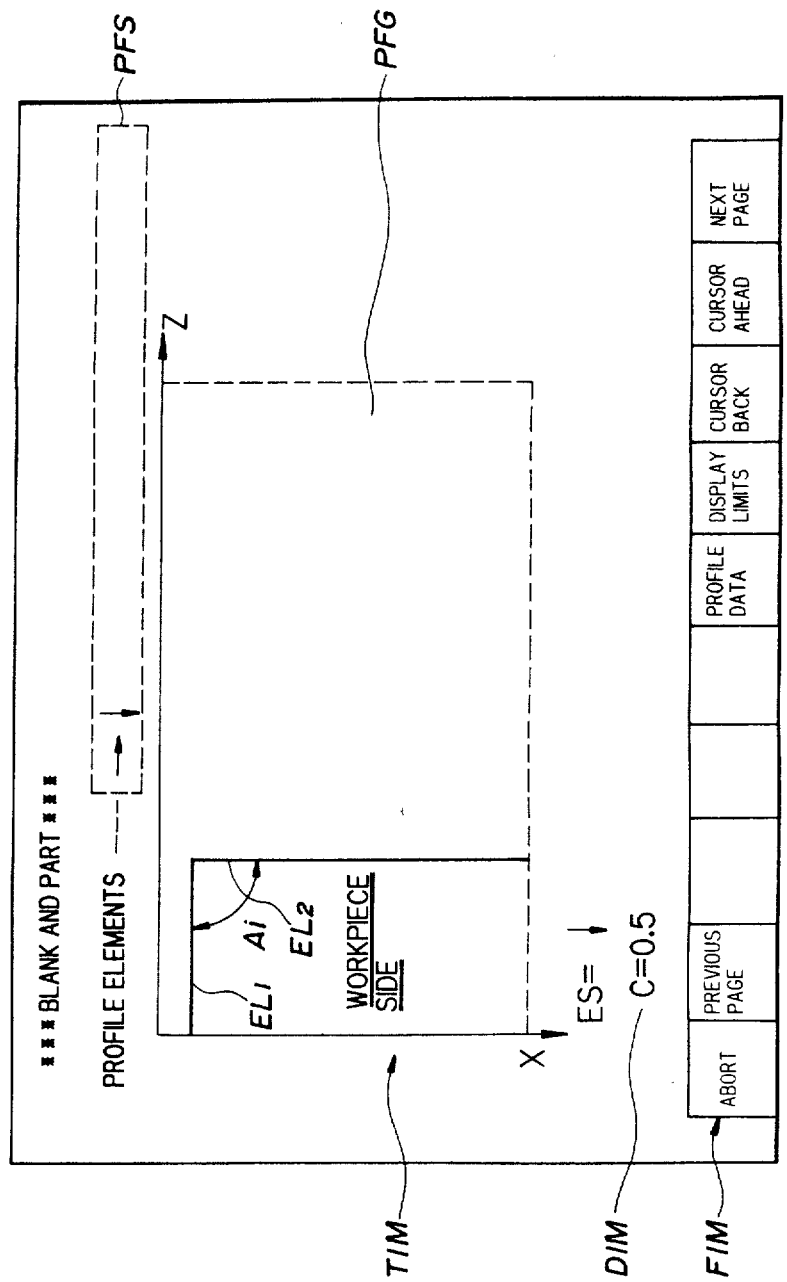

FIG. 6(a)

| ELEMENT | PROMPT REGARDING CORNER SHAPE | INPUT |
|---|---|---|
| → | NONE | |
| ↓ | C=0.5 | |
| → | R=□.□ | |
| ↻ | R=□.□ | 0.5C |
| → | NONE | |
| ↘ | R=□.□ | |
| ↓ | R=□.□ | 2 |
| → | R=□.□ | |
| ↓ | C=0.5 | 3C |
| ← | C=0.5 | |
| ↓ | R=□.□ | |
| ← | C=0.5 | |
| ↓ | R=□.□ | |

INPUT SEQUENCE ↓

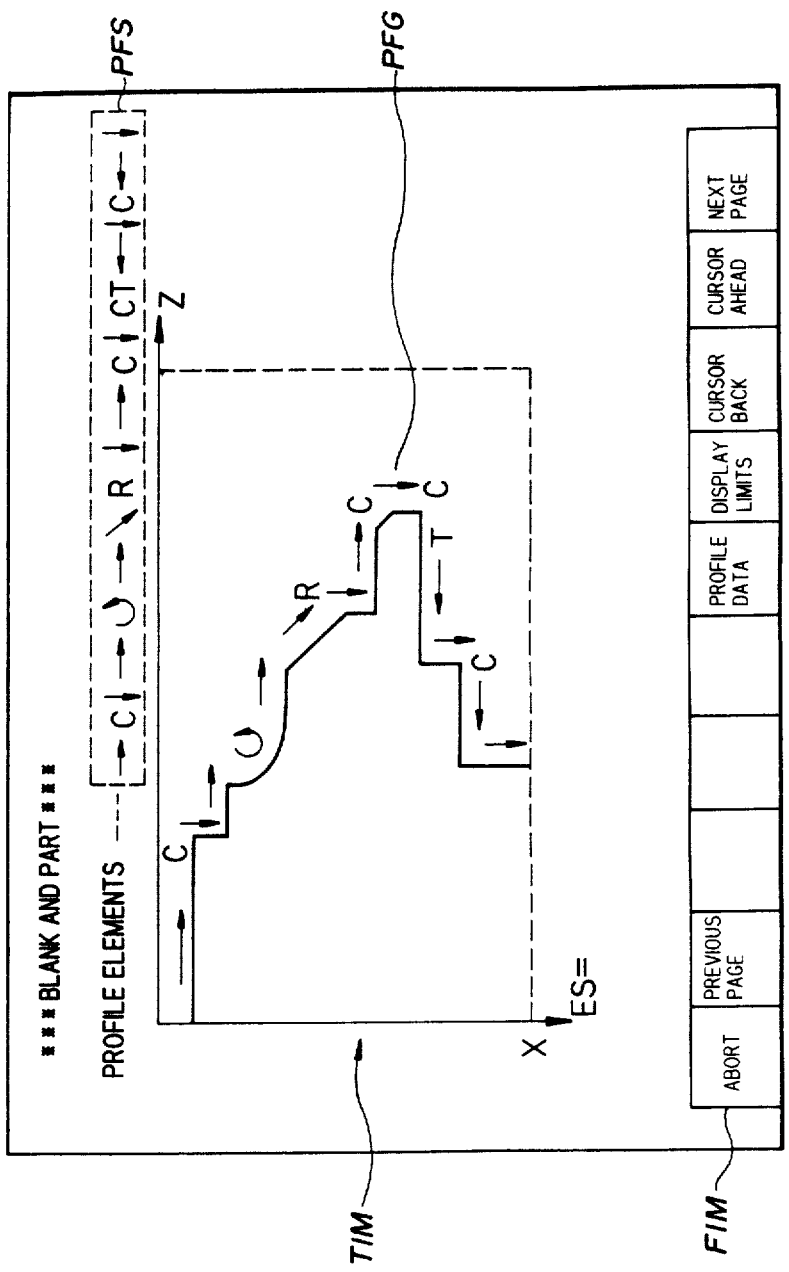

PART PROFILE INPUT METHOD

DESCRIPTION

1. Technical Field

This invention relates to a part profile input method and, more particularly, to a part profile input method in an NC data creating apparatus in which a part profile is specified by inputting profile elements of a part using arrow keys and NC data are created to perform machining in accordance with the specified part profile.

2. Background Art

An automatic programming system is available in which a conversational display and a function key (soft key) display are each presented in accordance with each step of a plurality of data input steps, a function key (soft key) conforming to a prescribed function and appearing on the function key display is pressed to thereby execute processing corresponding to the function, and an NC program is prepared using data inputted while referring to the conversational display. For example, see U.S. Pat. No. 4,490,781 (title: System and Method for Producing Numerical Control Information, registered on Dec. 25, 1984).

An automatic programming system of this kind, which will be described with reference to FIG. 7, successively displays predetermined prompt images (the conversational display) on a display screen in accordance with the following steps:

(1) a first step of selecting execution of "AUTOMATIC PROGRAMMING";
(2) a second step of selecting data to be inputted (a step to be executed next);
(3) a third step of selecting the material of a blank;
(4) a fourth step of setting surface roughness;
(5) a fifth step of selecting a drawing format;
(6) a sixth step of inputting the blank profile and the dimensions thereof;
(7) a seventh step of inputting a part profile and the dimensions thereof;
(8) an eighth step of inputting the machining reference point and turret position;
(9) a ninth step of selecting a machining process;
(10) a tenth step of selecting a tool and inputting tool data;
(11) an eleventh step of deciding machining conditions;
(12) a twelfth step of inputting cutting direction;
(13) a thirteenth step of inputting cutting limits;
(14) a fourteenth step of inputting whether or not an area is to be cut by the same tool; and
(15) a fifteenth step of computing a tool path (i.e. of preparing NC data).

An operator responds to these prompts by entering the necessary data from a keyboard. Finally, an NC program(NC data) is created using all of the entered data.

In the part profile input step (the seventh step) performed by this automatic programming system, a prompt (ES =) calling for a part profile element is displayed on the display screen, as shown in FIG. 8. In response to this prompt, arrow keys ( ↑, →, ↓, ←, ↗, ↙, ↖, ↘, ↶↷ ), a thread-cutting key, a chamfering key (C key), a rounding key (R key), a grooving key and a corner-removal key, which are provided on a keyboard, are operated in accordance with the part profile while a design drawing is observed. The part profile is thus inputted Whenever a single part profile element is inputted using an arrow key, a prompt calling for the dimensions of this element is displayed. In response to this prompt, dimensions taken from the design drawing are inputted, whereupon profile element symbols PFS and graphic images PFG of these profile elements appear on the display screen.

For example, when linear elements are inputted by pressing the arrow keys indicated by ↑, →, ↓, ←, ↗, ↙, ↖, ↘ , prompts appear calling for the X coordinate ($X_E$) of the end point of the straight line, the Z coordinate ($Z_E$) of this end point, whether or not this straight line contacts the preceding profile element or the next profile element, the angle which the straight line forms with the Z axis, etc. The dimensions written on the drawing are entered in response to these prompts. However, when the prescribed dimensions are not written on the drawing (as in the case of the angle formed with the Z axis, for example), this input is not required.

When a circular arc is inputted by pressing the arrow keys indicated by ↶ and ↷, prompts appear calling for the X and Z coordinates ($X_E,Z_E$) of the end point of the circular arc, the X and Z coordinates ($X_C,Z_C$) of the center of the circular arc, the radius R of the circular arc, and whether the arc contacts the preceding profile element or the next profile element. The dimensions written on the drawing are inputted in response to these prompts.

When chamfering is inputted by the C key, a prompt calling for the amount of chamfering appears. When rounding is inputted by the R key, a prompt inquiring about the radius of rounding is displayed. In response, the dimensions are entered in similar fashion.

When inputting of all profile elements is completed, all of the profile element symbols PFS of the part profile and the overall part profile figure PFG are displayed on the display screen.

Corner portions are defined between adjacent profile elements except in cases where the two profile elements are in contact. These corner portions can be broadly classified into outside corner portions and inside corner portions.

When a chamfer profile input is required at an outside corner portion, the conventional method is to press the C key on each such occasion and input a chamfering designation and dimensions. When rounding is required at an inside corner portion, the conventional method is to press the R key and input a rounding designation and dimensions.

In almost all cases, a chamfer profile of fixed dimensions is inserted at outside corner portions. Nevertheless, in accordance with the conventional method, chamfering must be designated and coordinates entered on each occasion. This is disadvantageous in that it makes the part profile input operation a troublesome task.

Accordingly, an object of the present invention is to provide a part profile input method in which, when a corner profile such as a chamfer profile or rounded profile is inputed, the labor involved in pressing a C key, a dimension input key or an R key at every input is eliminated, thereby making it possible to enhance part profile input operability.

SUMMARY OF THE INVENTION

When inputting a part profile, the angle between two mutually adjacent profile elements is computed, and whether the corner is an outside corner or an inside corner is determined by comparing the angle of intersection and a set angle. In case of an outside corner, a preset chamfer dimension is displayed. If the dimension is acceptable, an input key is pressed to input the chamfer profile at the corner portion. In case of an inner corner, a prompt display is presented inquiring whether a rounded profile is to be inserted. If insertion is required, a dimension is inputted and the input key is pressed to input the rounded profile.

BRIEF DESCRIPTION OF THE DRAWINGS

FIGS. 3(a), and 3(b), and 4 are examples of conversational displays, in which FIG. 3 is a display for inputting chamfer profiles and FIG. 4 is a display for inputting profiles other than chamfer profiles;

FIG. 6(a) is a relation chart showing a profile element input sequence, prompts regarding corner shape and dimensions inputted in response to the corner shape prompts;

FIGS. 7 and 8 are views for describing part profile input according to the prior art.

DESCRIPTION OF THE PREFERRED EMBODIMENT

Figure 1:
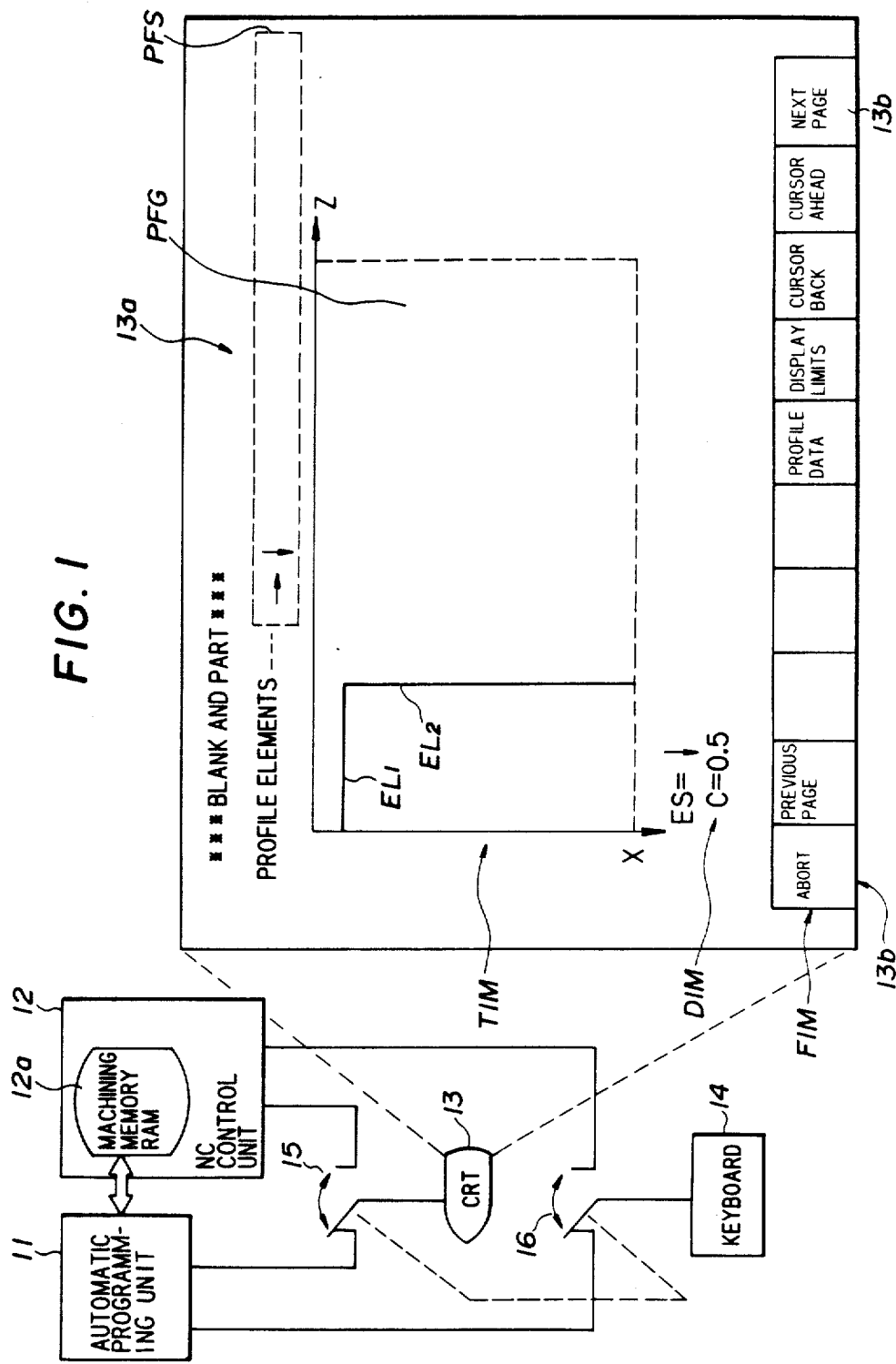
FIG. 1 is a block diagram of a conversational-type NC apparatus having an automatic programming function for realizing the method of the present invention.
Figure 2:
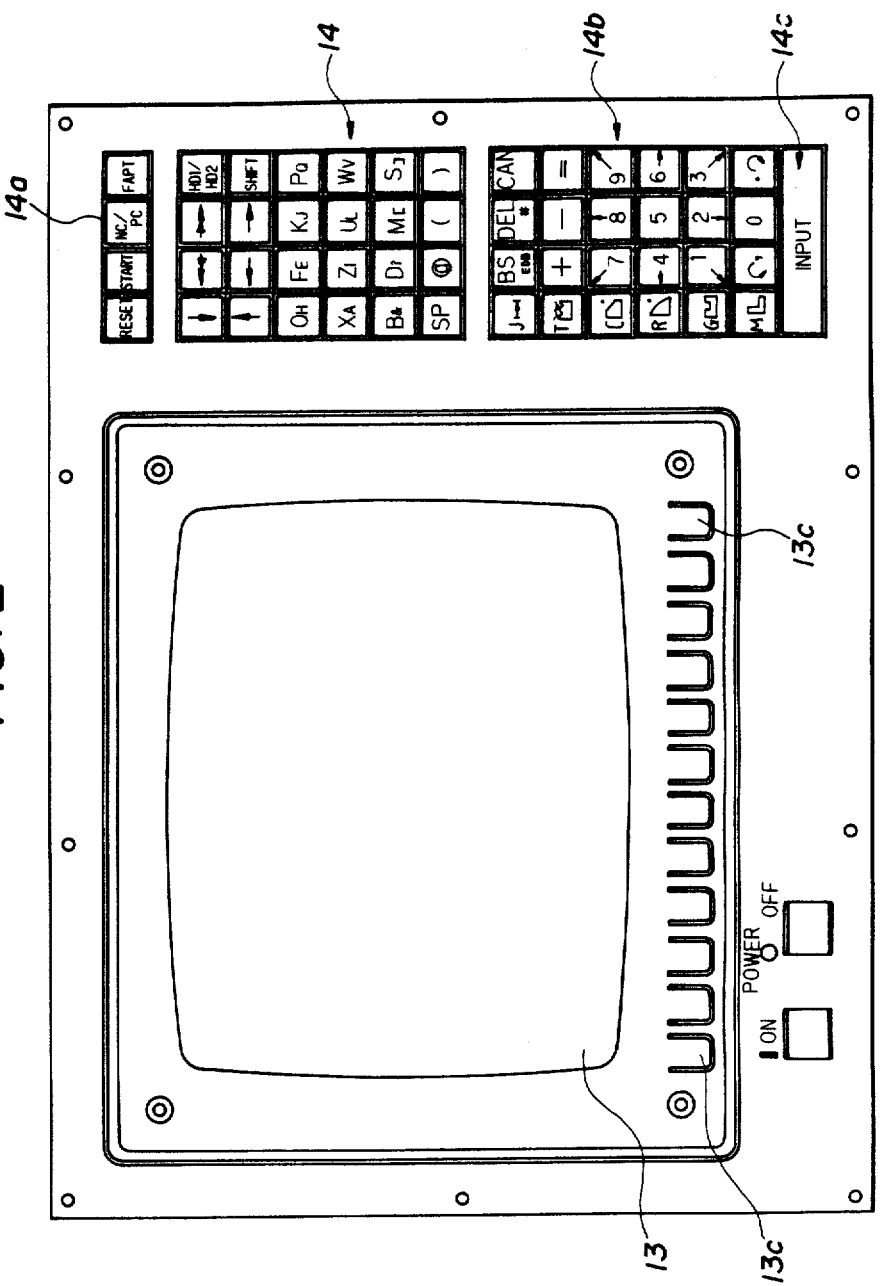
FIG. 2 is an external view of a CRT/MDI unit used in the conversational-type NC apparatus of FIG. 1.

FIG. 1 is a block diagram of an NC apparatus having an automatic programming function for realizing the method of the present invention, and FIG. 2 is an external view of a CRT/MDI unit.

In FIG. 1, numeral 11 denotes an automatic programming unit, 12 an NC control unit, numeral 13 denotes a graphic display unit (CRT), numeral 14 donates a keyboard, and numerals 15, 16 denotes changeover units. The changeover units 15, 16 are illustrated as being switches for the sake of the description. In actuality, however, changeover is effected by software processing.

The automatic programming unit 11 and NC control unit 12 are of microcomputer construction and use an internal processor, a control program memory (ROM) and a RAM.

The graphic display unit 13 and keyboard 14 are integrated into a single unit, as shown in FIG. 2, which is usually referred to as a CRT/MDI unit. As shown in FIG. 1, the display screen is divided into a conversational display area TIM and a soft key display area FIM. Keys 13c, 13c (see FIG. 2)... are provided to correspond to respective soft key areas 13b, 13b, . . . 13b. Pressing one of the keys enables the function displayed in the corresponding soft key area 13b to be inputted. The keyboard 14 has an NC mode/automatic programming mode selection key 14a and a key group 14b, which includes keys serving as both arrow and numeric keys as well as the C key and R key. Numeral 14c denotes an *input key*.

Figure 3B:
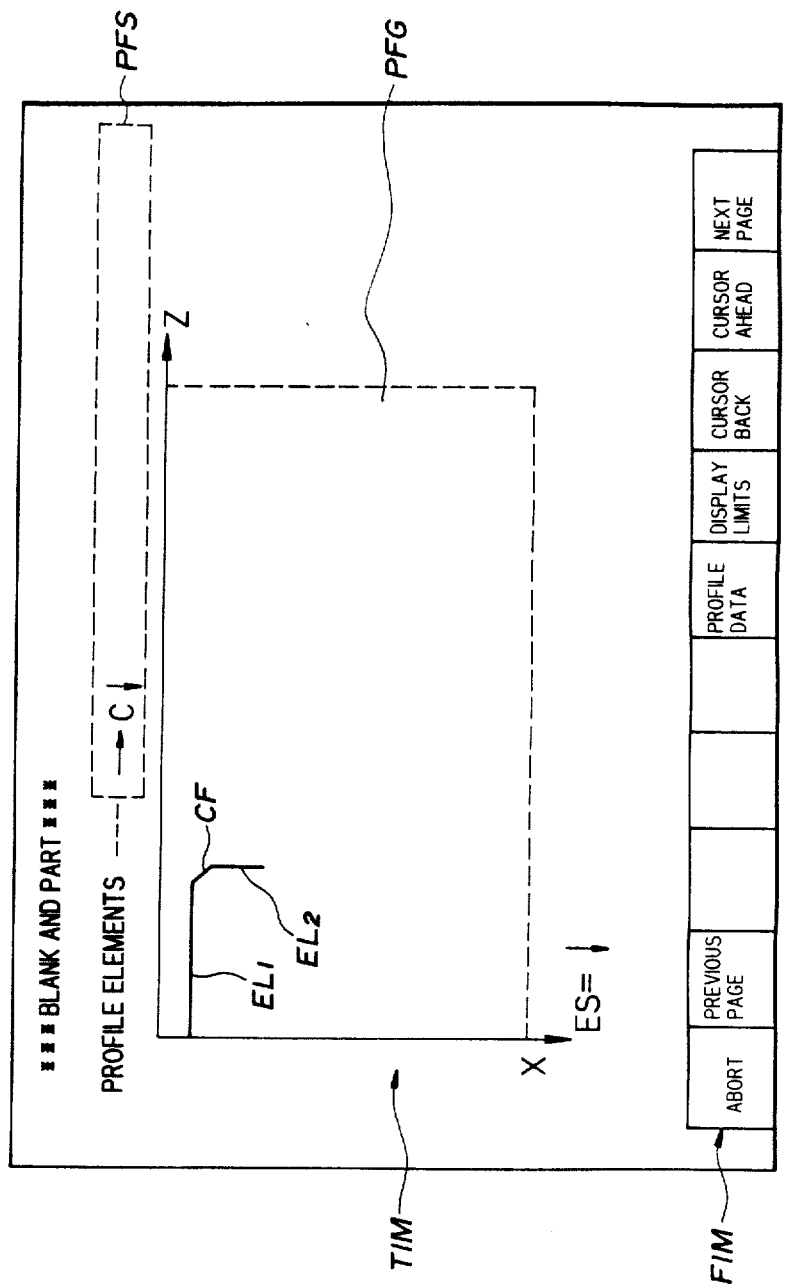
Figure 4:
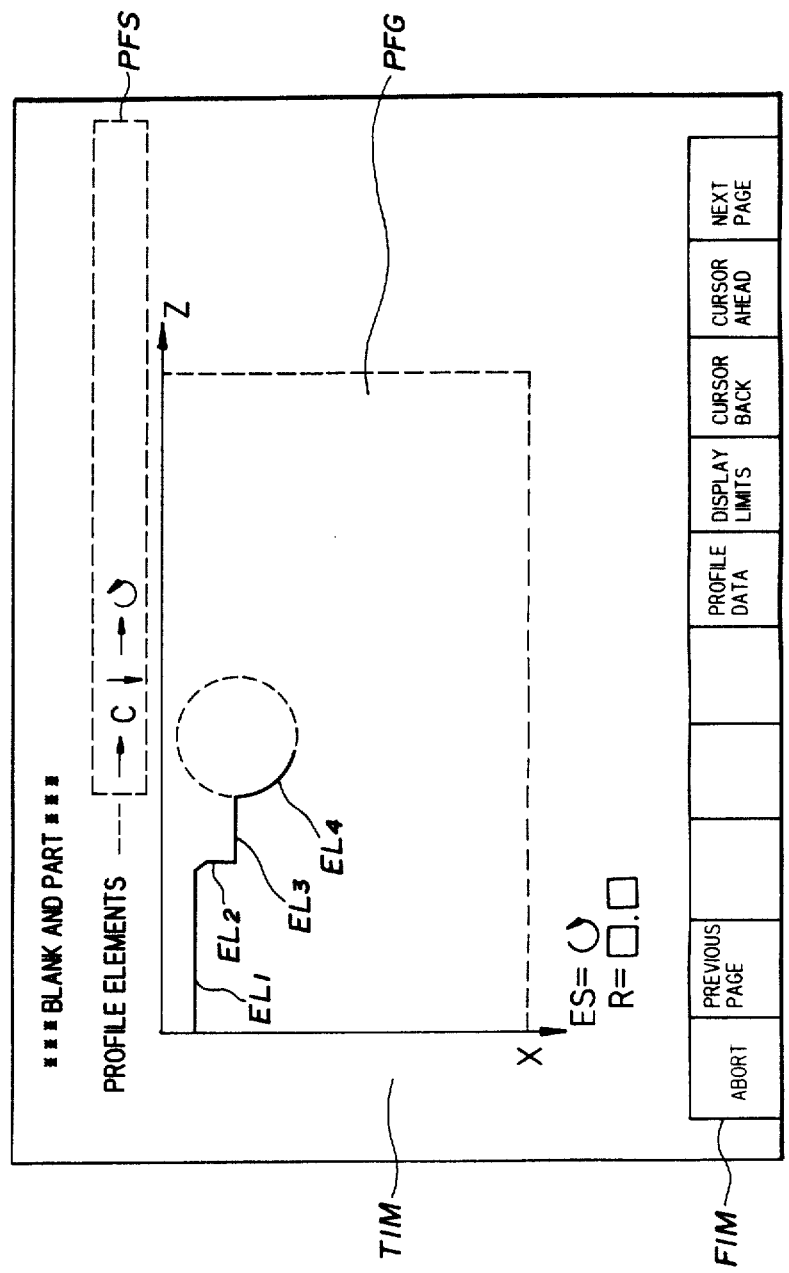
Figure 5A:
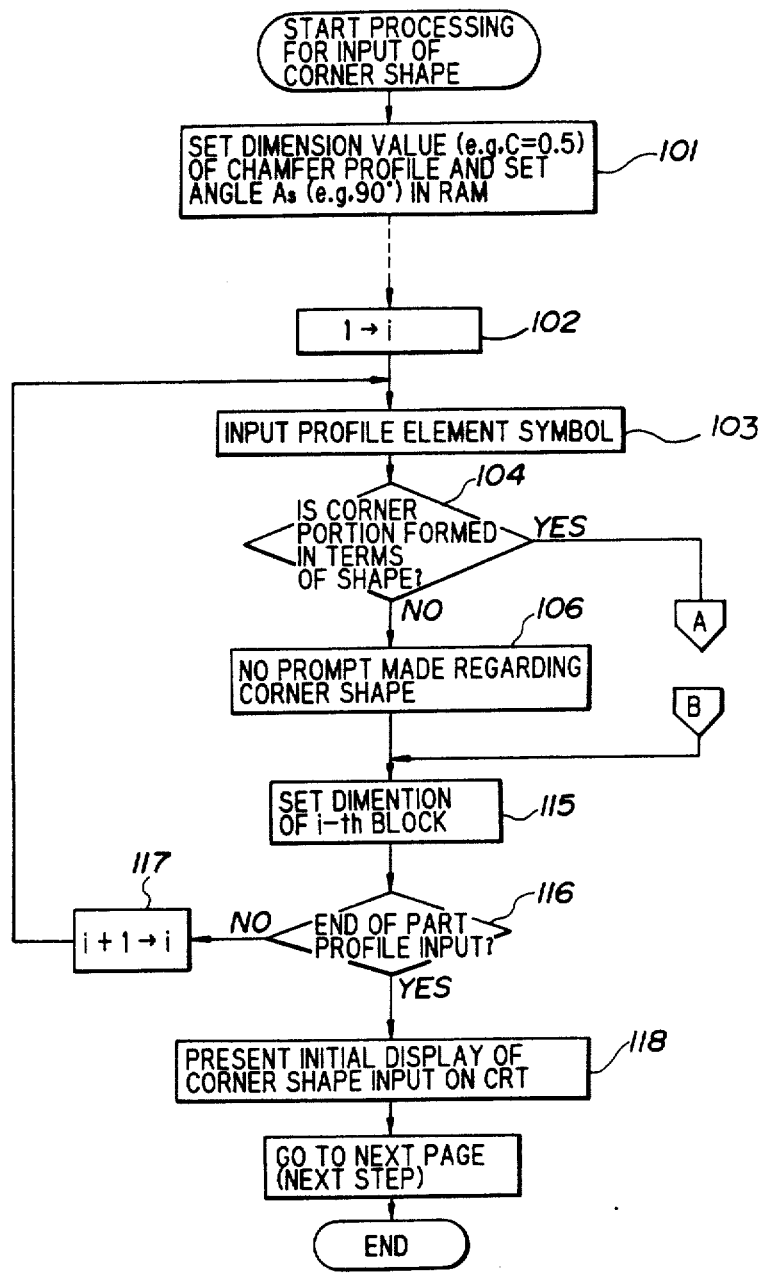
FIGS. 5(a) and 5(b) are a flowchart of processing according to the present invention.
Figure 5B:
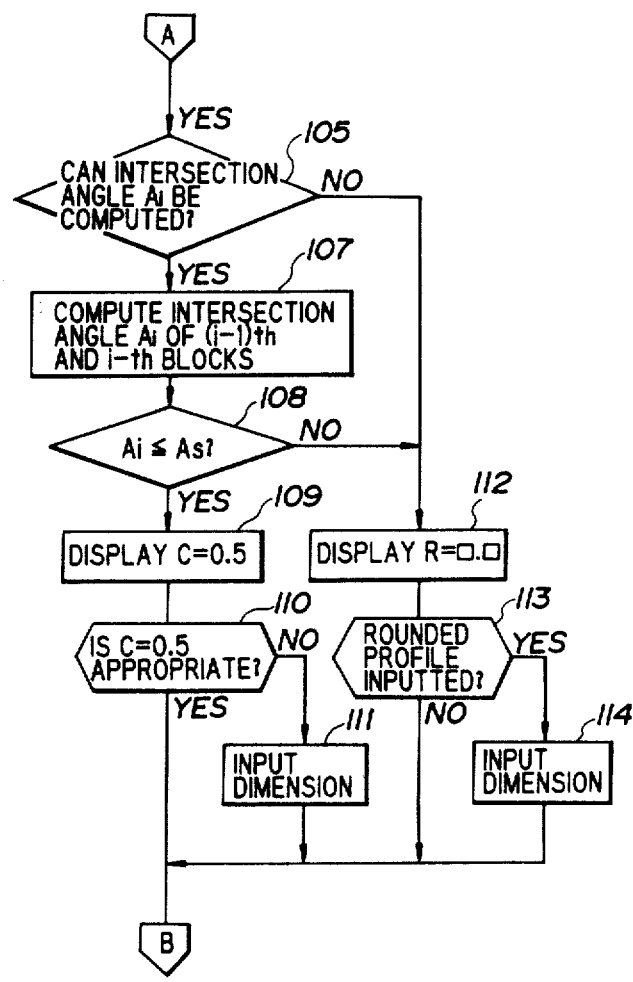
Figure 6B:
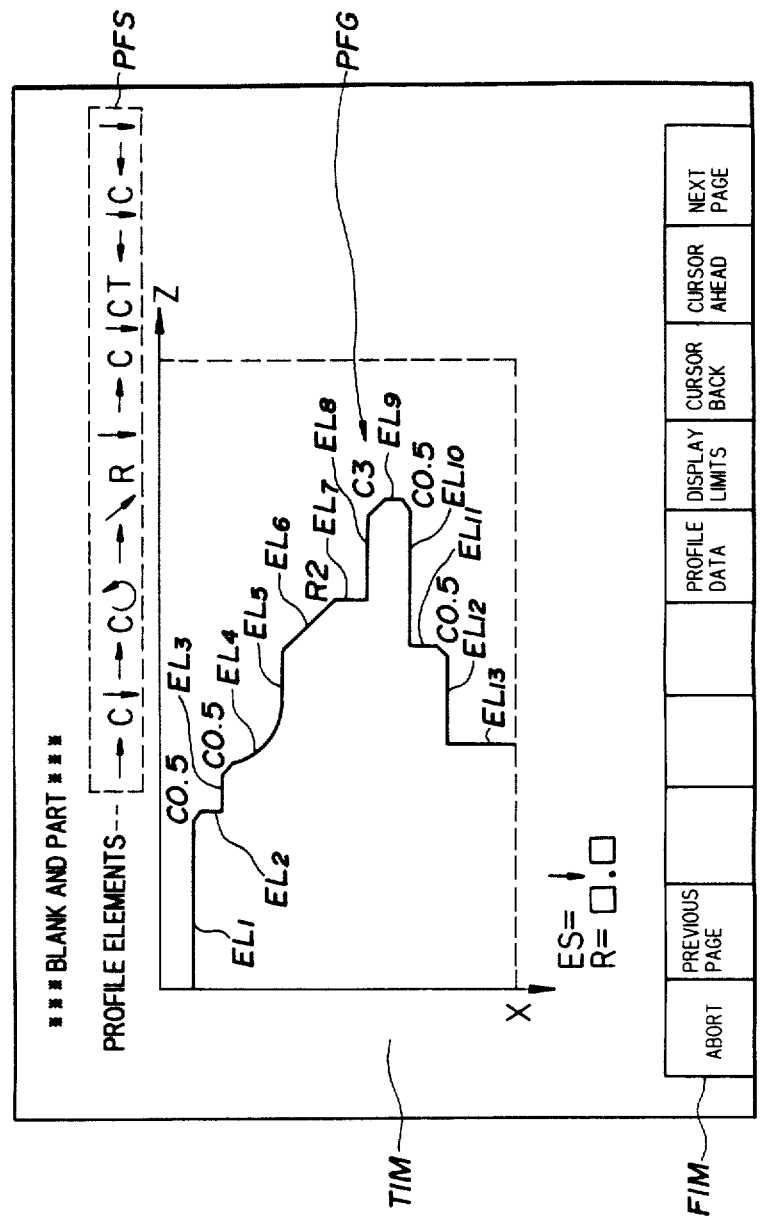
FIG. 6(b) shows a display of a part profile when inputted as shown in FIG. 6(a)

FIGS. 3(a), 3(b) and 4 are examples of, conversational displays for inputting corner shapes, FIG. 5 is a flowchart of processing according to the present invention, FIG. 6(a) is a relation chart showing a profile element input sequence, prompts regarding corner shape and dimensions inputted in response to the corner shape prompts, and FIG. 6(b) shows a part profile when inputted as shown in FIG. 6(a). Part profile input processing according to the present invention will now be described in accordance with the flowchart of FIGS. 5(a) and 5(b).

A dimension value of a chamfer profile to be inserted at a corner portion and a maximum angle $A_s$ (e.g., $A_s = 90°$ C.) regarded as a corner portion at which the chamfer profile is to be inserted are preset as parameters in a RAM of the automatic programming unit 11 (step 101).

Figure 7:
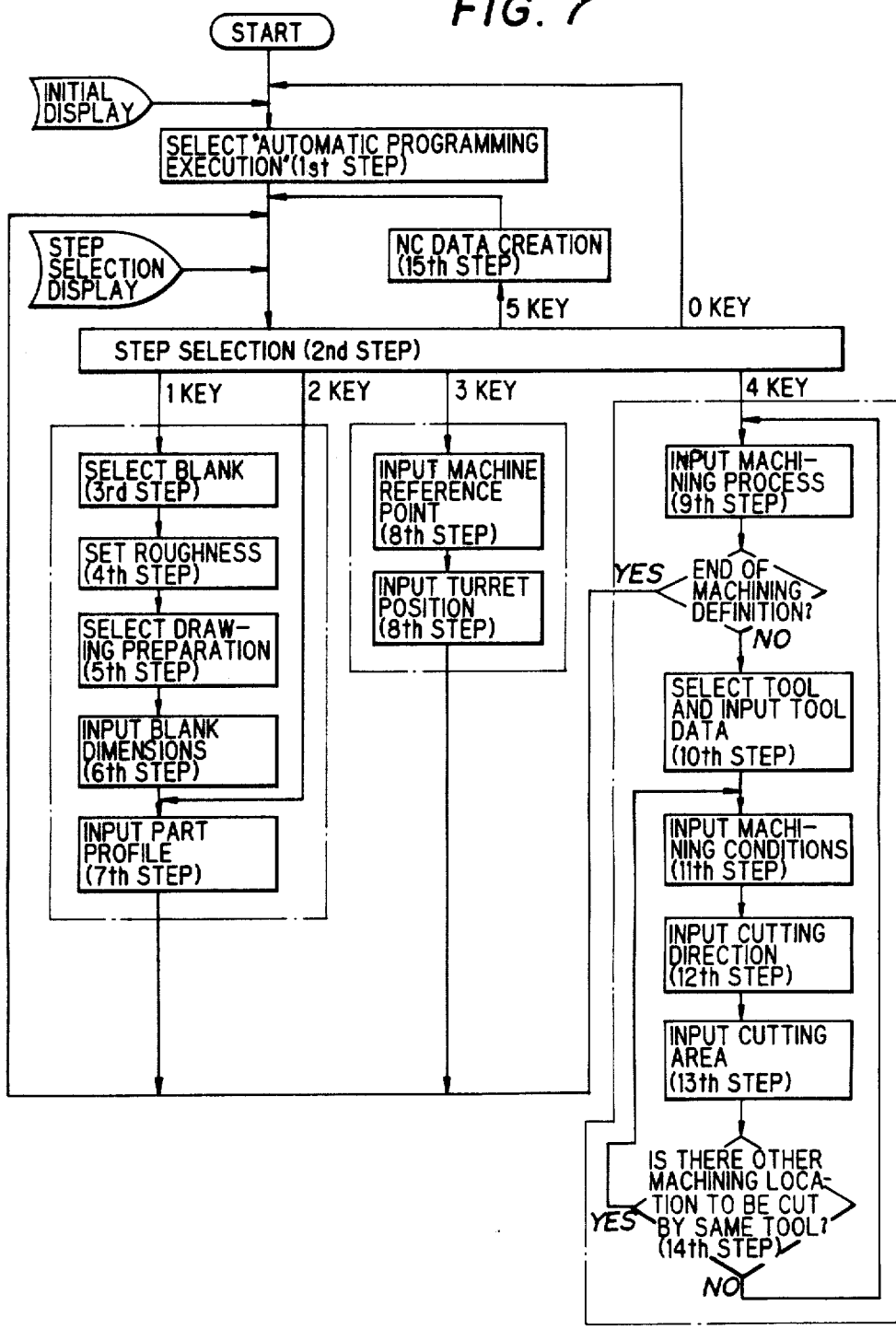

Next, the key 14a is operated to cause the changeover units 15, 16 to dedicate the graphic display unit 13 and keyboard 14 to the use of the automatic programming unit 11. Thereafter, processing up to a sixth step is executed conversationally, just as in the flow of the conventional method shown in FIG. 7, by the programming function of the automatic programming unit 11. When the soft key ("NEXT PAGE") is pressed in the sixth step, a part profile input processing routine is started and a part profile input display is presented to make possible a part profile input. The processor of the automatic programming unit 11 then performs the operation $1 \rightarrow i$ (step 102) (FIGS. 5(a).

Part profile elements are subsequently specified one at a time along the contour of the part to finally specify the part profile. More specifically, an i-th profile element which does not take a chamfer profile or rounded profile into account is inputted using the arrow keys 14b (step 103).

Since there are cases in which a corner is not formed between an inputted figure element and the preceding figure element, it is determined whether a corner is formed in terms of shape (step 104). A case in which a corner profile is not formed means that mutually adjacent profile elements are smoothly connected, as in the manner of profile elements EL4 and EL5 in FIG. 6(b), by way of example.

If a corner is not formed in terms of shape, no prompt regarding the shape of the corner is displayed (step 106).

If a corner profile is formed between an input profile element $EL_i$ and a preceding profile element $EL_{i-1}$, it is determined whether an intersection angle $A_i$ can be computed (step 105). It should be noted that when a circular arc or a slanted straight line is designated at the profile element $EL_i$, the intersection angle $A_i$ cannot be computed until the end point coordinates of the arc or line are specified.

If the angle of intersection can be computed, the processor computes the intersection angle $A_i$ defined by the profile element $EL_{i-1}$ of the (i-1)th block and the profile element $EL_i$ of the i-th block (step 107). The intersection angle $A_i$ is taken as being the angle on the inner side of the workpiece [see FIG. 3(a)].

Next, the angle $A_i$ and the set angle $A_s$ are compared in terms of size (step 108).

If $A_i \leq A_s$ holds, the intersection is taken as being an outer corner portion and a chamfer dimension $C = 0.5$ is displayed (step 109), as shown in FIG. 3(a), on the assumption that a chamfer having a preset dimension will be entered.

At this time the operator decides whether the numerical value of 0.5 is appropriate as the chamfer dimension. If 0.5 is appropriate, the operator presses the input key 14c (FIG. 2) to input the chamfer profile (step 110). It should be noted that pressing the input key inserts "C" between the profile elements → and |, inserts the chamfer profile CF between the profile elements $EL_{i-1}$, $EL_i$ (i=2), and causes the "C" and the chamfer profile CF to be displayed, as shown in FIG. 3(b).

When it is desired to input a dimension other than 0.5, the chamfer dimension is inputted at the keyboard 14b and the chamfer profile is inputted by pressing the input key 14c (step 111).

Next, the dimensions of the end point of the profile element $EL_i$ are entered just as in the prior art (step 115).

If $A_i > A_s$ holds in step 108, on the other hand, this corner is taken as being a corner other than an outside corner and "R", which means rounding, is displayed as the element (step 112). The dimension for rounding is taken as being an undefined value. Also, if it is decided at the step 105 that the intersection angle $A_i$ cannot be computed, the corner is taken as being a corner other than an outside corner, "R" is displayed as the element, and the dimension is dealt with as an undefined value [see FIG. 4 and step 112).

With R=□.□ displayed on the display screen, as shown in FIG. 4, it is determined whether a rounded profile is to be entered (step 113).

If a rounded profile is to be entered, the dimension of roundness is entered at the keyboard 14b and the rounded profile is entered by pressing the input key 14c. Further, in a case where it is desired to input the chamfer profile having the dimension 0.5 regardless of the fact that R=□.□ is being displayed, 0.5 C is entered at the keyboard 14b and the chamfer profile is entered by pressing the input key 14c (step 114).

If a rounded profile input is unnecessary, the input key 14c is pressed leaving R=□.□ displayed, the program proceeds to step 115 and the dimensions of the end point of the i-th profile element $EL_i$ are inputted.

Thereafter, a check is made as to whether entry of the entire part profile has ended (step 116).

If entry of the part profile has not ended, the processor of the automatic programming unit 11 performs the operation i+1→i (step 117) and processing from step 103 onward is subsequently repeated.

When input of the entire part profile ends, the soft key "PROFILE DATA" on the initial display is pressed to display a list of data inputted thus far (step 118).

If no revision is required based on the displayed list, the soft key "NEXT PAGE" is pressed to display the next conversational page and automatic programming processing is subsequentially continued.

Thus, in accordance with the present invention, the arrangement is such that after a profile element is entered by an arrow key, the inner angle defined by this profile element and the profile element inputted immediately ahead of it is determined. If this angle is less than a set angle, a prompt is displayed inquiring as to whether a chamfer of a preset dimension is to be inserted at the corner portion of these two profile elements, and the shape of the corner portion is specified. If the angle is greater than the set value, then a prompt inquiring whether a rounded profile is to be inserted at the corner portion of these two profile elements is displayed and the shape of the corner portion is specified. Accordingly, the labor involved in pressing the C key, dimension input key or R key each time is dispensed with, thus making it possible to enhance part profile input operability.

We claim:

1. A part profile input method in an NC data creating apparatus in which a part profile is specified by inputting profile elements of a part and inputting dimensions specifying the profile elements, and NC data are created for machining a blank in accordance with the specified part profile, said method comprising the steps of:
   inputting a current profile element;
   determining if an angle can be defined by said profile element and a previously inputted profile element;
   defining said angle if it can be determined;
   displaying a prompt inquiring if a displayed preset dimension chamfer is to be inserted at a corner portion of the current profile element and the previously inputted profile element; and
   specifying the corner portion if said angle is less than a set angle.

2. A part profile input method according to claim 1, further comprising the steps of:
   inputting a chamfer having a dimension different from said displayed preset dimensioned chamfer; and
   revising said displayed preset dimension in accordance with said inputted chamfer.

3. A part profile input method according to claim 1, further comprising the steps of:
   displaying a prompt inquiring if a rounded profile is to be inserted at the corner portion of the current profile element and the previously inputted profile element if said angle is greater than a set value; and
   specifying the shape of the corner portion.

4. A part profile input method according to claim 1, further comprising the steps of:
   displaying a prompt inquiring if a rounded profile is to be inserted at the corner portion of the current profile element and the previously inputted profile element if said angle cannot be determined; and
   specifying the shape of the corner portion.

* * * * *